US009631686B2

(12) United States Patent
Takei

(10) Patent No.: US 9,631,686 B2
(45) Date of Patent: Apr. 25, 2017

(54) ELECTRIC PARKING BRAKE DEVICE AND RELEASE METHOD THEREFOR

(71) Applicant: Hitachi Automotive Systems, Ltd., Hitachinaka-shi, Ibaraki (JP)

(72) Inventor: Osamu Takei, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 45 days.

(21) Appl. No.: 14/660,206

(22) Filed: Mar. 17, 2015

(65) Prior Publication Data

US 2016/0032993 A1 Feb. 4, 2016

(30) Foreign Application Priority Data

Jul. 31, 2014 (JP) ................................ 2014-156915

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| ***F16D 65/18*** | (2006.01) |
| ***B60T 8/171*** | (2006.01) |
| ***F16D 65/56*** | (2006.01) |
| ***B60T 13/74*** | (2006.01) |
| ***F16D 55/226*** | (2006.01) |
| *F16D 121/24* | (2012.01) |
| *F16D 121/26* | (2012.01) |
| *F16D 125/36* | (2012.01) |
| *F16D 121/02* | (2012.01) |
| *F16D 125/48* | (2012.01) |
| *F16D 125/50* | (2012.01) |

(52) U.S. Cl.

CPC .............. *F16D 65/18* (2013.01); *B60T 8/171* (2013.01); *B60T 13/741* (2013.01); *F16D 55/226* (2013.01); *F16D 65/183* (2013.01); *F16D 65/56* (2013.01); *F16D 2121/02* (2013.01); *F16D 2121/24* (2013.01); *F16D 2121/26* (2013.01);

(Continued)

(58) Field of Classification Search

CPC .. B60T 13/741; F16D 65/183; F16D 2121/02; F16D 2125/50; F16D 2121/26; F16D 55/226; F16D 65/56; F16D 65/18; F16D 2125/36; F16D 2121/24; F16D 2125/48

USPC .................................. 701/70; 188/162, 72.1

See application file for complete search history.

(56) References Cited

U.S. PATENT DOCUMENTS 8,322,473 B2 * 12/2012 Hilberer .................. B60T 7/122 180/244
8,527,176 B2 * 9/2013 Zimmermann ....... B60T 8/4022 188/137

(Continued)

FOREIGN PATENT DOCUMENTS

JP 2012-101749 A 5/2012
JP 2012-229798 A 11/2012

(Continued)

*Primary Examiner* — Jaime Figueroa
(74) *Attorney, Agent, or Firm* — Crowell & Moring LLP

(57) ABSTRACT

An electric parking brake device holds a parking brake in a braking state by a rotation-linear motion conversion mechanism that converts rotation of an electric motor into a motion in a linear direction, and releases the parking brake by the rotation-linear motion conversion mechanism. In a case of releasing the parking brake, the electric motor is controlled by combining PWM control and ON/OFF control with each other. When the electric motor is driven according to the PWM control, and a predetermined time has elapsed after start of the PWM control, then the electric motor is changed to drive according to the ON/OFF control. In the ON/OFF control, a change in which a drive current of the electric motor is decreased stepwise is detected, whereby a torque drop of the rotation-linear motion conversion mechanism is detected.

20 Claims, 10 Drawing Sheets

(52) U.S. Cl.
CPC ...... *F16D 2125/36* (2013.01); *F16D 2125/48* (2013.01); *F16D 2125/50* (2013.01)

(56) References Cited

U.S. PATENT DOCUMENTS

| | | | | |
|---|---|---|---|---|
| 2004/0026989 A1* | 2/2004 | Suzuki | B60T 17/16 303/89 |
| 2013/0158783 A1* | 6/2013 | Zimmermann | B60T 8/4022 701/34.4 |
| 2015/0224895 A1* | 8/2015 | Morita | B60L 3/0023 318/494 |
| 2015/0224970 A1* | 8/2015 | Yasui | B60T 8/17616 701/74 |
| 2015/0316933 A1* | 11/2015 | Masuda | F16D 65/18 318/626 |
| 2016/0178020 A1* | 6/2016 | Masuda | F16D 65/18 188/162 |

FOREIGN PATENT DOCUMENTS

| | | | |
|---|---|---|---|
| JP | WO 2014038602 A1 * | 3/2014 | B60T 8/17616 |
| JP | WO 2014087813 A1 * | 6/2014 | F16D 65/18 |

* cited by examiner

ELECTRIC PARKING BRAKE DEVICE AND RELEASE METHOD THEREFOR

BACKGROUND OF THE INVENTION

1. Field of the Invention

The present invention relates to an electric parking brake device that performs an actuation and release of a parking brake by an electric motor, and to a release method therefor.

2. Description of Related Art

In Japanese Patent Application Laid-Open Publication No. 2012-229798, a disc brake including a parking brake mechanism is disclosed. This parking brake mechanism has a ball-and-ramp mechanism and a screw mechanism. Then, by rotation of an electric motor, the parking brake mechanism moves a piston by the ball-and-ramp mechanism and the screw mechanism, and holds the piston at the brake position by the screw mechanism.

Moreover, in Japanese Patent Application Laid-Open Publication No. 2012-101749, an electric parking brake that performs an actuation and release thereof by an electric motor and a cable is disclosed. In this patent literature, in an actuation state of the brake, the number of rotations of the electric motor is decreased before ending the actuation of the brake. The electric motor is driven by pulse width modulation (PWM) control, in which the number of rotations is controlled by a duty ratio of a drive pulse. In comparison with ON/OFF control, the PWM control can decrease the number of rotations of the motor, and accordingly, becomes an effective means for reducing operating noise of a reduction mechanism.

Incidentally, in the parking brake mechanism, a stroke amount is changed depending on a depression amount of the brake and a thickness of pad. Therefore, in an event of releasing the parking brake, it is necessary to detect a torque drop of a rotation-linear motion conversion mechanism that converts the rotation of the electric motor into a motion in a linear direction.

However, in the PWM control, current control is performed at a short time interval so that the electric motor can reach target torque, and accordingly, such a change that a drive current is greatly decreased stepwise is not generated. Therefore, the torque drop of the rotation-linear motion conversion mechanism cannot be detected. If a vehicle is moved while leaving the parking brake unreleasable, then it is possible that rear wheel dragging may occur.

SUMMARY OF THE INVENTION

It is an object of the present invention to provide an electric parking brake device and a release method, which are capable of reducing a possibility of rear wheel dragging in the event of releasing the parking brake.

According to an aspect of this invention, there is provided an electric parking brake device that holds a parking brake in a braking state by a rotation-linear motion conversion mechanism that converts rotation of an electric motor into a motion in a linear direction, and releases the parking brake by the rotation-linear motion conversion mechanism, the electric parking brake device including: a drive control device configured to control the parking brake by the rotation-linear motion conversion mechanism, wherein the drive control device drives the electric motor according to PWM control and changes the electric motor to drive according to ON/OFF control after a predetermined time has elapsed after start of the PWM control in a case of releasing the parking brake.

According to another aspect of this invention, there is provided an electric parking brake device including: a piston that presses a brake pad against a rotor; a transfer mechanism that moves the piston forward by converting rotation of an electric motor into a motion in a linear direction, presses the brake pad against the rotor, and holds the brake pad at a brake position; a ball-and-ramp mechanism that temporarily stops actuation of the piston with respect to the rotation of the electric motor after the brake pad starts to be released; and a drive control device that controls the driving of the electric motor, in which the drive control device drives the electric motor according to pulse width modulation (PWM) control when the brake pad starts to be released, and after a predetermined time has elapsed after start of the PWM control, changes the electric motor to ON/OFF control and drives the electric motor.

According to still another aspect of this invention, there is provided a release method of an electric parking brake device that holds a parking brake in a braking state by a rotation-linear motion conversion mechanism that converts rotation of an electric motor into a motion in a linear direction, and releases the parking brake by the rotation-linear motion conversion mechanism, the release method including: driving the electric motor according to pulse width modulation (PWM) control; sensing that a predetermined time has elapsed after start of the PWM control; and changing the electric motor to drive according to ON/OFF control.

Other objects and features of aspects of the present invention will be understood from the following description with reference to the accompanying drawings.

DESCRIPTION OF PREFERRED EMBODIMENTS

First, a configuration of a disc brake to which the present invention is applied and a function of a parking brake are described based on FIG. 1 to FIG. 3 and FIGS. 4A and 4B to FIGS. 9A and 9B. Next, a first control operation of an electric motor in the disc brake is described in detail by FIG. 10 to FIG. 13, and a second control operation therefor is described in detail by FIG. 14 and FIG. 15.

[Configuration of Disc Brake]

Figure 1:
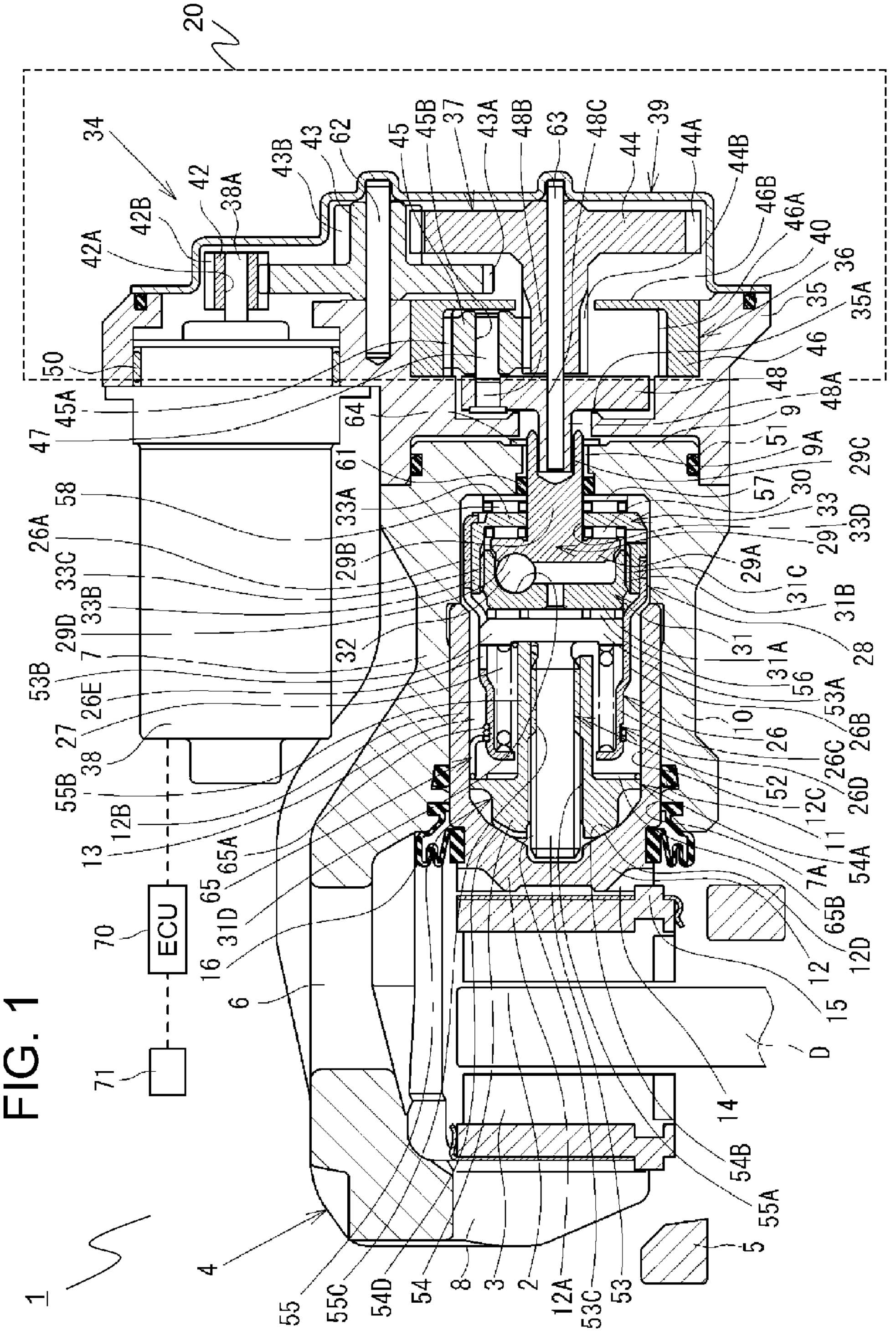
FIG. 1 is a cross-sectional view illustrating a disc brake to which an electric parking brake device according to an embodiment of the present invention is applied.
Figure 3:
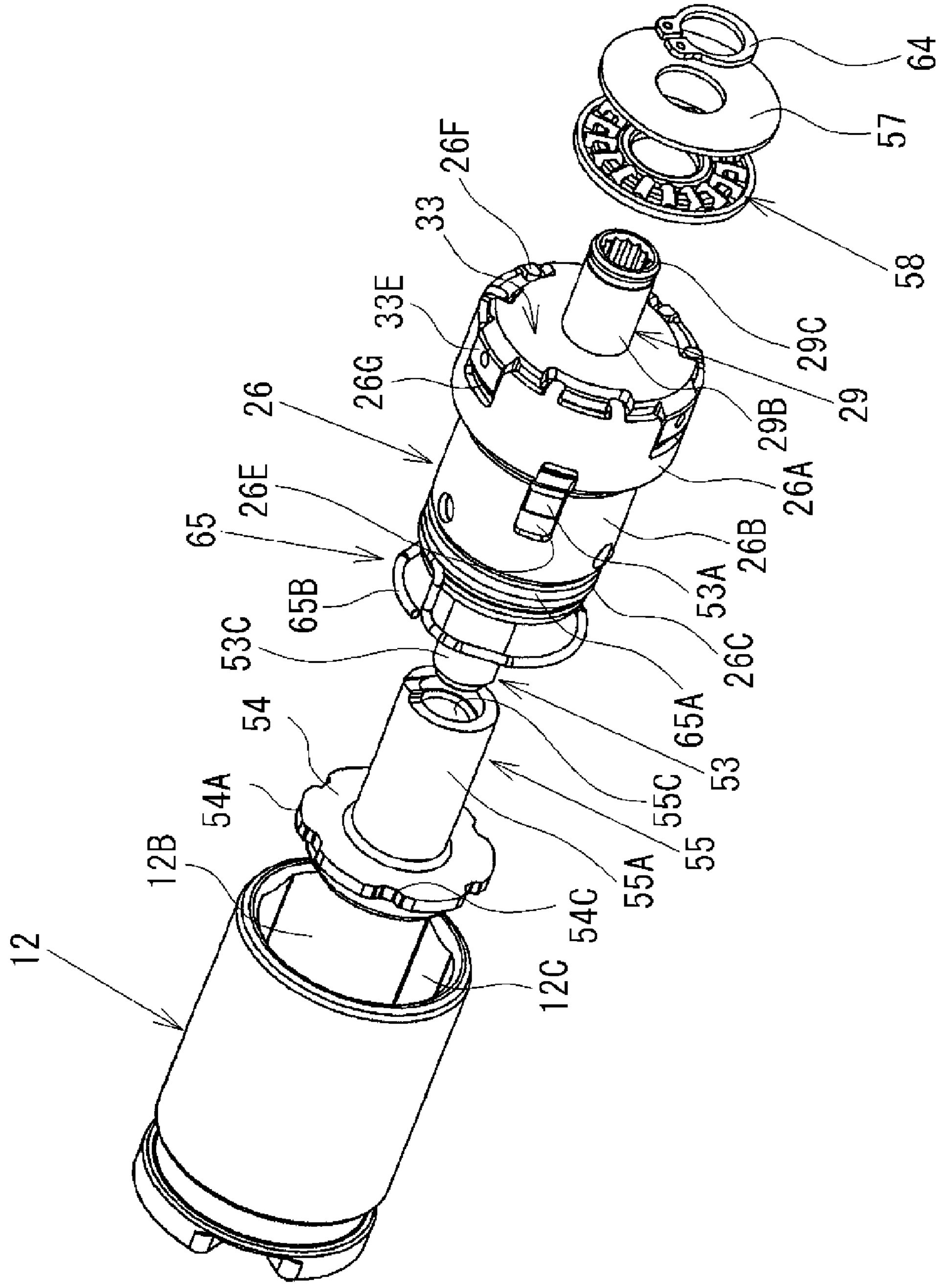
FIG. 3 is an exploded perspective view of a piston, a screw mechanism, the ball-and-ramp mechanism and the like, which are employed in the disc brake illustrated in FIG. 1.

As illustrated in FIG. 1 and FIG. 3, there are provided: a pair of inner brake pad 2 and an outer brake pad 3, which are arranged on both sides of a disc rotor D in an axial direction thereof while sandwiching disc rotor D therebetween, disc rotor D being attached to a rotating portion of a vehicle; and a brake caliper 4 in disc brake 1. This disc brake 1 is configured as a caliper floating type. Note that the pair of inner brake pad 2 and outer brake pad 3 and brake caliper 4 are supported on a carrier 5, which is fixed to a non-rotating portion such as a knuckle of the vehicle, so as to be movable in the axial direction of the disc rotor D.

A caliper body 6 as a main body of brake caliper 4 includes: a cylinder portion 7 arranged on a base end side opposed to inner brake pad 2 in an inside of the vehicle; and a claw portion 8 arranged on a tip end side opposed to outer brake pad 3 on an outside of the vehicle. In cylinder portion 7, a bottomed cylinder 10 is formed, in which an inner brake pad 2 side becomes an opening portion 7A, and an opposite side thereof is closed by a bottom wall 9 having a hole portion 9A. In this cylinder 10, a piston seal 11 is interposed on an inner circumferential portion thereof on an opening portion 7A side.

A piston 12 is formed into a bottomed cup shape including a bottom portion 12A and a cylindrical portion 12B. Piston 12 is housed in cylinder 10 so that bottom portion 12A thereof can be opposed to inner brake pad 2. Piston 12 is attached to an inside of cylinder 10 so as to be movable in the axial direction in a state of being brought into contact with piston seal 11. A space between this piston 12 and bottom wall 9 of cylinder 10 is defined as a fluid pressure chamber 13 by piston seal 11. This fluid pressure chamber 13 is supplied with a fluid pressure from a fluid pressure source such as a master cylinder and a fluid pressure control unit through a port (not illustrated) provided in cylinder portion 7. In piston 12, a recessed portion 14 is provided on an outer circumferential side of a bottom surface thereof opposite to inner brake pad 2. A protruding portion 15 formed on a back surface of inner brake pad 2 engages with this recessed portion 14, and by this engagement, piston 12 is prevented from rotating with respect to cylinder 10, and eventually, to caliper body 6. Moreover, between bottom portion 12A of piston 12 and cylinder 10, a dust boot 16 that prevents a foreign object from entering cylinder 10 is interposed.

A housing 35 is hermetically attached to a bottom wall 9 side of cylinder 10 of caliper body 6. A cover 39 is hermetically attached to an opening on one end of housing 35. In these housing 35 and cylinder 10, air tightness thereof is held by a seal 51. Moreover, in housing 35 and cover 39, air tightness thereof is held by a seal 40. To housing 35, a motor (electric motor) 38 is hermetically attached through seal 50 so as to be arrayed in line with caliper body 6. Note that, in this example, motor 38 is arranged on an outside of housing 35; however, housing 35 may be formed so as to cover motor 38, and motor 38 may be housed in housing 35. In this case, seal 50 becomes unnecessary, and reduction of labor for assembly can be achieved.

Caliper body 6 includes: a piston holding mechanism 34 as a parking brake mechanism that moves piston 12 forward and holds piston 12 at a brake position; and a multi-spur reduction mechanism 37 and a planetary gear reduction mechanism 36 as reduction mechanisms which boost rotation by motor 38. Piston holding mechanism 34, multi-spur reduction mechanism 37 and planetary gear reduction mechanism 36 function as a transfer mechanism 20 that transfers a rotational motion of motor 38 to piston 12, and are housed in housing 35.

Piston holding mechanism 34 includes: a ball-and-ramp mechanism 28 that converts the rotational motion from multi-spur reduction mechanism 37 and planetary gear reduction mechanism 36, that is, the rotation of motor 38 into a motion in the linear direction (hereinafter, referred to as a "linear motion" for convenience), applies thrust force to piston 12 and moves piston 12; a push rod 53 that becomes a part of a pressing member that presses piston 12 by actuation of ball-and-ramp mechanism 28; and a screw mechanism 52 as a thrust force holding mechanism that is arranged between bottom wall 9 of cylinder 10 and push rod 53, in other words, between ball-and-ramp mechanism 28 and piston 12 and holds piston 12 at the brake position. Piston holding mechanism 34, multi-spur reduction mechanism 37, planetary gear reduction mechanism 36, piston 12, ball-and-ramp mechanism 28, screw mechanism 52 and the like function as a rotation-linear motion conversion mechanism that converts the rotation of motor 38 into the motion in the linear direction.

Note that, in order to obtain rotational force to move piston 12 forward, multi-spur reduction mechanism 37 and planetary gear reduction mechanism 36 as the reduction mechanisms which boost the rotation by motor 38, are provided; however, it is not necessarily necessary to provide these. If the rotational force to enable motor 38 to move piston 12 forward can be outputted, it is possible to omit either or both of the reduction mechanisms.

Multi-spur reduction mechanism 37 is composed by including a pinion gear 42, a first reduction gear 43 and a second reduction gear 44. Pinion gear 42 is formed into a tubular shape, and has: a hole portion 42A press-fitted and fixed to a rotating shaft 38A of motor 38; and a gear 42B formed on an outer circumference thereof. In first reduction gear 43, a large gear 43A with a large diameter, which meshes with gear 42B of pinion gear 42, and a small gear 43B with a small diameter, which is formed by being extended from large gear 43A in the axial direction, are formed integrally with each other. In this first reduction gear 43, one end thereof is supported on housing 35, and other end thereof is supported so as to be rotatable by a shaft 62 supported on cover 39. In second reduction gear 44, a large gear 44A with a large diameter, which meshes with small gear 43B of first reduction gear 43, and a sun gear 44B with a small diameter, which is formed by being extended from large gear 44A in the axial direction, are formed integrally with each other. Sun gear 44B composes a part of planetary gear reduction mechanism 36 to be described later. This second gear 44 is supported so as to be rotatable by a shaft 63 supported on cover 39.

Planetary gear reduction mechanism 36 includes sun gear 44B, a plurality (three in this example) of planetary gear 45, an internal gear 46 and a carrier 48. Planetary gears 45 include: gears 45A allowed to mesh with sun gear 44B of second reduction gear 44; and holes portions 45B which allow pins 47 erected from carrier 48 to insert therethrough. Three planetary gears 45 are arranged at an equal interval on a circumference of carrier 48.

Carrier 48 is formed into a disc shape, and on a center thereof, a polygonal prism 48A is protruded on the inner brake pad 2 side. Polygonal prism 48A of carrier 48 is fitted to a polygonal hole 29C provided in a columnar portion 29B of a rotation ramp 29 of ball-and-ramp mechanism 28 to be described later, whereby carrier 48 and rotation ramp 29 can transfer rotational torque to each other. A plurality of pin-oriented holes 48B is formed on an outer circumference side of carrier 48. Pins 47 which rotatably support respective planetary gears 45 are press-fitted and fixed to respective pin-oriented holes 48B. In carrier 48 and respective planetary gears 45, movement thereof in the axial direction is regulated by a wall surface 35A of housing 35 and by an annular wall portion 46B provided integrally on a second reduction gear 44 side of internal gear 46. Moreover, in carrier 48, an insertion hole 48C is formed in a center thereof. To insertion hole 48C, a shaft 63 is press-fitted and fixed, which is supported on cover 39, and freely rotatably supports second reduction gear 44. Note that, in this example, relative rotation of carrier 48 and rotation ramp 29 is regulated by polygonal prism 48A provided in carrier 48; however, a mechanical element such as a spline and a key, which can transfer the rotational torque, may be employed.

Internal gear 46 is formed of: an internal gear 46A with which gears 45A of respective planetary gears 45 mesh; and annular wall portion 46B, which is integrally provided on the second reduction gear 44 side continuously from this internal gear 46A, and regulates the movement of planetary gears 45 in the axial direction. Internal gear 46 is press-fitted and fixed into housing 35.

Screw mechanism 52 is composed as the thrust force holding mechanism that holds piston 12 at the brake position, and includes: a base nut 33 as a screw member that is screwed to an outer circumference of a cylindrical portion 31B of a rotation/linear motion ramp 31 to be described later; and a nut 55 as an abutment member that is screwed to push rod 53.

Push rod 53 is composed in such a manner that a collar portion 53A and a screwed portion 53C are formed integrally with each other. Collar portion 53A is arranged opposite to rotation/linear motion ramp 31 of ball-and-ramp mechanism 28 in the axial direction through a thrust bearing 56. A coil spring 27 is interposed between collar portion 53A and a retainer 26 to be described later. Coil spring 27 always urges push rod 53 to a thrust bearing 56 side, that is, to the bottom wall 9 side of cylinder portion 7. Moreover, coil spring 27 urges rotation/linear motion ramp 31 of ball-and-ramp mechanism 28 to be described later to a bottom wall 9 side of cylinder portion 7 through push rod 53. On push rod 53, a plurality of protruding portions 53B are provided on an outer circumferential surface of collar portion 53A along a circumferential direction. Protruding portions 53B are individually fitted to a plurality of oblong groove portions 26E provided on a diameter-reduced portion 26B of retainer 26 to be described later along the circumferential direction. Protruding portions 53B and oblong groove portions 26E are fitted to each other as described above, whereby push rod 53 is movable in the axial direction within a range of a length of oblong groove portions 26E in the axial direction; however, movement thereof in the rotation direction is regulated with respect to retainer 26.

Nut 55 is formed into a T-shape when a cross section thereof in the axial direction is viewed and into a mushroom shape when an exterior appearance thereof is viewed in such a manner that a hole portion 55A as a through hole is provided and that cylindrical portion 55B on one end side thereof and a flange portion 54 on other end side thereof are formed integrally with each other. In hole portion 55A, on a position thereof corresponding to cylindrical portion 55B, a screwed portion 55C as an abutment member screw portion, which is screwed to screwed portion 53C of push rod 53, is formed.

On an outer circumferential end of flange portion 54, a plurality of protruding portions 54A are formed at an interval in the circumferential direction. These respective protruding portions 54A abut against a plurality of planar portions 12C, which are extended in the axial direction on an inner circumferential surface of cylindrical portion 12B of piston 12 and are provided at an interval in the circumferential direction. By such abutment, nut 55 is movable in the axial direction with respect to piston 12; however, movement thereof in the rotation direction is regulated. An inclined surface 54B is formed on a tip end surface of flange portion 54 of nut 55. Inclined surface 54B is made capable of abutting against an inclined surface 12D formed on an inside of bottom portion 12A of piston 12. Inclined surface 54B of flange portion 54 of nut 55 abuts against inclined surface 12D of piston 12, whereby the rotational force from motor 38 is transferred to piston 12 through push rod 53, nut 55 and flange portion 54, which are screw mechanism 52. In this way, piston 12 advances. On protruding portions 54A and inclined surface 54B of flange portion 54 of nut 55, a plurality of groove portions 54C (refer to FIG. 3) and 54D are formed. These groove portions 54C and 54D allow a space, which is surrounded by bottom portion 12A of piston 12 and flange portion 54, to communicate with fluid pressure chamber 13, enable a flow of brake fluid therebetween, and ensure air bleeding characteristics of the above-described space.

In order that nut 55 cannot rotate by an axial load from piston 12 to rotation/linear motion ramp 31, screwed portions 53C and 55C of push rod 53 and nut 55 are set so that reverse efficiency thereof can be 0 or less, that is, set as screws with large irreversibility. In this example, a pressing member is composed of push rod 53 and nut 55 as the abutment member.

Ball-and-ramp mechanism 28 includes: rotation ramp 29 as an input member; rotation/linear motion ramp 31 as a follower member; and balls 32 interposed between rotation ramp 29 and rotation/linear motion ramp 31. In this example, rotation/linear motion ramp 31 also has a function as base nut 33 as the screw member and a function as screw mechanism 52 mentioned above.

Rotation ramp 29 is composed of: a disc-like rotation plate 29A; and columnar portion 29B extended from a substantial center of rotation plate 29A integrally therewith, and is formed into a T-shape on an axial cross section. Columnar portion 29B is inserted through an insertion hole 33D provided in a bottom wall 33A of base nut 33 and through hole portion 9A provided in bottom wall 9 of cylinder 10. On a tip end of columnar portion 29B, polygonal hole 29C to which polygonal prism 48A provided on carrier 48 is fitted is formed. Moreover, on a surface of rotation plate 29A, which is opposite with a columnar portion 29B side, a plurality, three in this example, of ball grooves 29D are formed, which are extended in a circular arc shape while having a predetermined inclination angle along the circumferential direction, and have circular arc cross sections in a radial direction.

Moreover, rotation plate 29A is supported through a thrust bearing 30 so as to be freely rotatable with respect to bottom wall 33A of base nut 33. A seal 61 is provided between hole portion 9A of bottom wall 9 of cylinder 10 and an outer circumferential surface of columnar portion 29B of rotation ramp 29, and fluid tightness of fluid pressure chamber 13 is held. A retaining ring 64 is mounted on a tip end portion of columnar portion 29B of rotation ramp 29, and movement of rotation ramp 29 to the inner and outer brake pads 2 and 3 side with respect to caliper body 6, that is, movement hereof in such a rotor axial direction. Then, by such regulation for rotation ramp 29, which is as described above, base nut 33 is not allowed to move in the rotor axial direction with respect to caliper body 6. Hence, a female screw portion 33C formed on base nut 33 is not allowed to move in the rotor axial direction with respect to caliper body 6, either.

Figure 2:
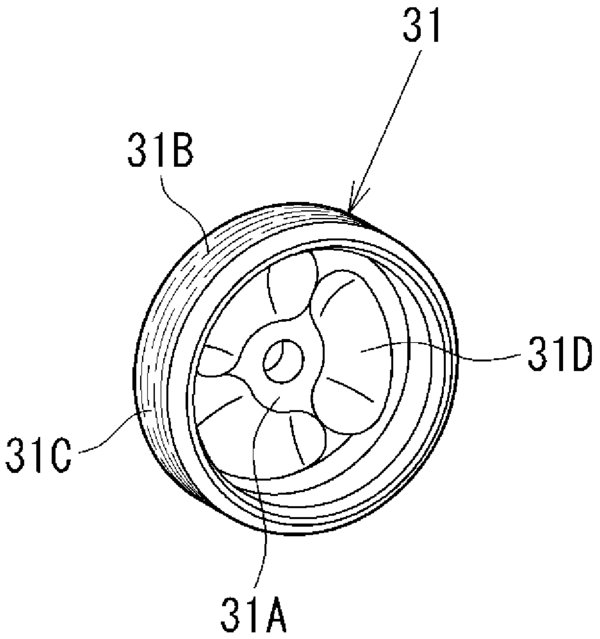
FIG. 2 is a perspective view of a rotation/linear motion ramp of a ball-and-ramp mechanism employed in the disc brake illustrated in FIG. 1.

As also illustrated in FIG. 2, rotation/linear motion ramp 31 is formed into a bottomed cylinder shape composed of: a disc-like rotation/linear motion plate 31A; and a cylindrical portion 31B erected from an outer circumferential end of rotation/linear motion plate 31A. On a surface of rotation/linear motion plate 31A, which faces to rotation plate 29A of rotation ramp 29, a plurality, three in this example, of ball grooves 31D are formed, which are extended in a circular arc shape while having a predetermined inclination angle along the circumferential direction, and have circular arc cross sections in the radial direction. Moreover, on the outer circumference of cylindrical portion 31B, a male screw portion 31C, which is screwed to female screw portion 33C provided on an inner circumferential surface of cylindrical portion 33B of base nut 33, is formed.

Base nut 33 is formed into a bottomed cylinder shape composed of: bottom wall 33A; and cylindrical portion 33B erected from an outer circumferential end of bottom wall 33A. On the inner circumferential surface of cylindrical portion 33B, female screw portion 33C, which is screwed to male screw portion 31C provided on an outer circumferential surface of cylindrical portion 31B of rotation/linear motion ramp 31, is formed. In a substantial center of bottom wall 33A of base nut 33, insertion hole 33D, through which columnar portion 29B of rotation ramp 29 is inserted, is formed. Then, in base nut 33, columnar portion 29B of rotation ramp 29 is inserted through insertion hole 33D of bottom wall 33A thereof so that rotation/linear motion ramp 31 and rotation plate 29A of rotation ramp 29 can be housed in cylindrical portion 33B thereof. Moreover, in base nut 33, bottom wall 33A is sandwiched between thrust bearing 30 and a thrust bearing 58, which are arranged between bottom wall 9 of cylinder 10 and rotation plate 29A of rotation ramp 29.

In this way, base nut 33 is supported through thrust bearing 58 and a thrust washer 57 so as to be rotatable with respect to bottom wall 9 of cylinder 10. However, in base nut 33, a plurality of protruding portions 33E (refer to FIG. 3) provided on the outer circumference thereof are fitted to recessed portions 26G (refer to FIG. 3) provided in retainer 26, whereby relative rotational movement to retainer 26 is regulated. Moreover, on a rear end portion of a large-diameter portion 26A of retainer 26, a plurality of claw portions 26F (refer to FIG. 3) are formed. Base nut 33 is assembled to a predetermined position in retainer 26, and thereafter, respective claw portions 26F are folded in a center direction of retainer 26, whereby movement of base nut 33 to the second reduction gear 44 side is regulated.

Note that male screw portion 31C of cylindrical portion 31B of rotation/linear motion ramp 31 and female screw portion 33C provided on cylindrical portion 33B of base nut 33 are formed so that rotation/linear motion ramp 31 can be spaced apart from base nut 33 when rotation/linear motion ramp 31 rotates in a same direction as that of rotation ramp 29 in a case in which rotation ramp 29 is rotated in one direction, and where rotation/linear motion ramp 31 is spaced apart from rotation ramp 29 by a rolling function of balls 32 between opposed ball grooves 29D and 31D of rotation ramp 29 and rotation/linear motion ramp 31.

Balls 32 are composed of steel balls as rolling members, and three balls 32 are provided in this example. Balls 32 are interposed between respective ball grooves 29D of rotation plate 29A of rotation ramp 29 and respective ball grooves 31D of rotation/linear motion plate 31A of rotation/linear motion ramp 31 one by one. Then, when the rotational torque is applied to rotation ramp 29, balls 32 roll between ball grooves 29D and 31D. Here, since rotation/linear motion ramp 31 is screwed to base nut 33, if the balls 32 roll, then rotation/linear motion ramp 31 advances in the axial direction while rotating with respect to base nut 33 when base nut 33 does not rotate with respect to cylinder 10.

At this time, rotation/linear motion ramp 31 is allowed to advance in the axial direction until rotational torque of rotation/linear motion ramp 31, which is generated by the rolling of balls 32, and rotation resistance torque of male screw portion 31C and female screw portion 33C, which are screwed portions of rotation/linear motion ramp 31 and base nut 33, are balanced. Moreover, in male screw portion 31C and female screw portion 33C, which are screwed portions of rotation/linear motion ramp 31 and base nut 33, base nut 33 does not rotate depending on the axial load from piston 12 to rotation/linear motion ramp 31. That is to say, male screw portion 31C and female screw portion 33C are set so that reverse efficiency thereof can be 0 or less, that is, set as screws with large irreversibility. Note that ball grooves 29D and 31D may be configured so as to be dented midway on inclinations thereof going along the circumferential direction, or so that the inclinations can be changed midway.

Retainer 26 is formed into a substantially cylindrical shape as a whole, and is composed of: large-diameter portion 26A located on bottom wall 9 side of cylinder 10; diameter-reduced portion 26B reduced in diameter from this large-diameter portion 26A toward opening portion 7A of cylinder 10; and a small-diameter portion 26C extended from this diameter-reduced portion 26B toward a direction of opening portion 7A of cylinder 10. On a tip end portion (on right side in FIG. 1) of large-diameter portion 26A, the plurality of claw portions 26F (refer to FIG. 3), which are partially folded to a center side thereof, and engage base nut 33, are formed. Moreover, on diameter-reduced portion 26B of retainer 26, the oblong groove portions 26E, which are provided in plural along the circumferential direction, are formed, and the plurality of protruding portions 53B, which correspond thereto and are provided on collar portion 53A of push rod 53, are fitted thereto. Oblong groove portions 26E and protruding portions 53B are fitted to each other as described above, whereby push rod 53 is prevented from rotating with respect to retainer 26, and it is made possible to move oblong groove portions 26E in the axial direction with respect to retainer 26.

Moreover, a coil portion 65A of a spring clutch 65 as a one-way clutch member is wound around an outer circumference of small-diameter portion 26C of retainer 26. This spring clutch 65 is configured to apply the rotational torque when retainer 26 rotates in one direction, but to hardly apply the rotational torque when retainer 26 rotates in another direction. Here, rotational resistance torque is applied to the rotation direction when nut 55 moves in the direction of ball-and-ramp mechanism 28.

A magnitude of the rotational resistance torque of spring clutch 65 is greater than the rotational resistance torque of screwed portions 31C and 33C of rotation/linear motion ramp 31 and base nut 33, which is generated by urging force of coil spring 27 in an event where rotation/linear motion ramp 31 and base nut 33 come close to each other in the axial direction. Moreover, on a tip end side (left side in FIG. 1) of spring clutch 65, a ring member 65B is formed, and abuts against planar portions 12C of piston 12 in a similar way to respective protruding portions 54A of nut 55. In this way, while spring clutch 65 is movable in the axial direction with respect to piston 12, movement thereof in the rotation direction is regulated. In this example, the screw mechanism is composed of male screw portion 31C of rotation/linear motion ramp 31, base nut 33, retainer 26, push rod 53 and nut 55.

To motor 38, an electronic control unit (ECU) 70 is connected, which is a drive control device that controls drive of motor 38. To ECU 70, a parking switch 71 is connected, which is operated in order to instruct the actuation and release of the parking brake. Note that ECU 70 can be actuated not only by a manual switch operation by a button and a lever, but also based on a signal from a vehicle side (not illustrated), for example, based on information from a controller area network (CAN) without an operation of parking switch 71.

Next, a description is made of a function of disc brake 1 mentioned above.

[Function as Usual Fluid Brake]

First, a description is made of a function at a time of braking of disc brake 1 as a usual fluid brake, the braking being performed by an operation of a brake pedal. When the brake pedal is depressed by a driver, a fluid pressure corresponding to depression force to the brake pedal is supplied from the master cylinder (not illustrated) through a fluid pressure circuit (not illustrated) to fluid pressure chamber 13 in brake caliper 4. In this way, piston 12 advances (moves in left direction of FIG. 1) from an original position at a non-braking time while elastically deforming piston seal 11, and then presses inner brake pad 2 against disc rotor D. Then, caliper body 6 moves in a right direction in FIG. 1 with respect to caliper 5 by reaction force to pressing force of piston 12, and presses outer brake pad 3, which is attached to claw portion 8, against disc rotor D. As a result, disc rotor D is sandwiched by the pair of inner and outer brake pads 2 and 3, whereby friction force is generated, and eventually, braking force of the vehicle is generated.

Then, when the driver releases the brake pedal, the supply of the fluid pressure from the master cylinder is stopped, and the fluid pressure in fluid pressure chamber 13 is decreased. In this way, piston 12 retreats to the original position by resilience of the elastic deformation of piston seal 11, and the braking force is released. In this connection, when a movement amount of piston 12 is increased following abrasion of inner and outer brake pads 2 and 3 and exceeds a limit of the elastic deformation of piston seal 11, slippage occurs between piston 12 and piston seal 11. By this slippage, the original position of piston 12 with respect to caliper body 6 is moved, whereby a pad clearance is adjusted to be constant.

[Function of Parking Brake]

Figure 4A:
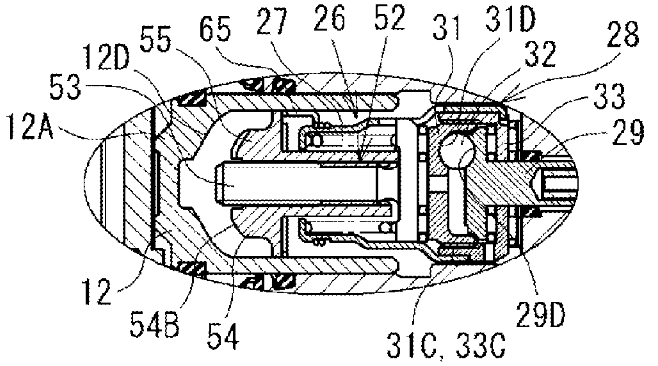
FIGS. 4A and 4B are cross-sectional views illustrating a function of the parking brake in the disc brake, which is illustrated in FIG. 1, step by step.
Figure 4B:
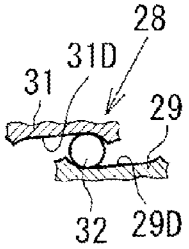

Next, a description is given of a function as the parking brake for maintaining a stopped state of the vehicle based on FIG. 4A and FIG. 4B while also referring to FIG. 1. FIG. 1, FIG. 4A and FIG. 4B illustrate a state in which the parking brake is released. At a time of actuating the parking brake from this state in such a manner that parking switch 71 is operated, motor 38 is driven by ECU 70, and sun gear 44B of planetary gear reduction mechanism 36 rotates through multi-spur reduction mechanism 37. By rotation of this sun gear 44B, carrier 48 rotates through respective planetary gears 45. The rotational force of carrier 48 is transferred to rotation ramp 29.

Here, because of the urging force of coil spring 27, which is transferred through push rod 53, rotation/linear motion ramp 31 of ball-and-ramp mechanism 28 needs a certain level or more of thrust force, and eventually rotational torque T1 in order to advance with respect to caliper body 6 (that is, to move in the left direction in FIG. 1). For this, in a state in which the pair of inner and outer brake pads 2 and 3 and disc rotor D do not abut against each other and the pressing force from piston 12 to disc rotor D is not generated, necessary rotational torque T2 necessary to rotate push rod 53 is sufficiently less than the necessary rotational torque T1 necessary to advance rotation/linear motion ramp 31. Moreover, at the time of actuating the parking brake, rotational resistance torque T3 by spring clutch 65 is not applied, either.

Figure 5A:
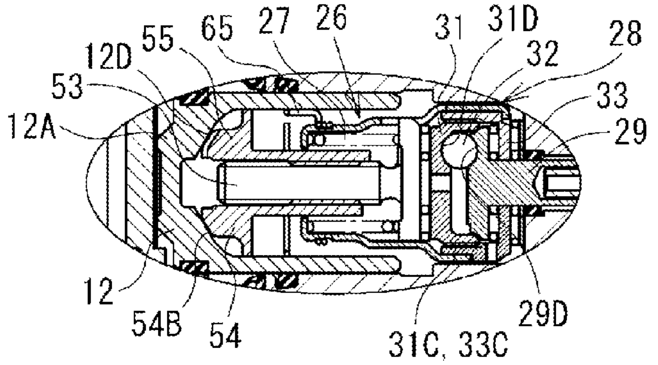
FIGS. 5A and 5B are cross-sectional views illustrating the function of the parking brake in the disc brake, which is illustrated in FIG. 1, step by step.
Figure 5B:
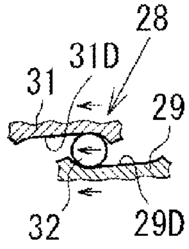

Therefore, in an initial period when the rotational force is transferred from carrier 48 to rotation rap 29, rotation/linear motion ramp 31 does not advance, and accordingly, as illustrated in FIG. 5A and FIG. 5B, rotation ramp 29 and rotation/linear motion ramp 31 to start to co-rotate. Most of rotational force in this case, which excludes an amount of a mechanical loss, is transferred from screwed portions 31C and 33C of rotation/linear motion ramp 31 and base nut 33 through retainer 26 and pushrod 53 to screw mechanism 52. Hence, screw mechanism 52 is actuated in a state in which mechanical efficiency is good. That is to say, by the rotational force of carrier 48, carrier 48 rotates rotation ramp 29, rotation/linear motion ramp 31, base nut 33, retainer 26 and push rod 53 integrally with one another. By this rotation of push rod 53, nut 55 advances (moves in the left direction in FIG. 1), and inclined surface 54B of flange portion 54 of nut 55 abuts against inclined surface 12D of piston 12, and presses inclined surface 12D, whereby piston 12 advances.

Figure 6A:
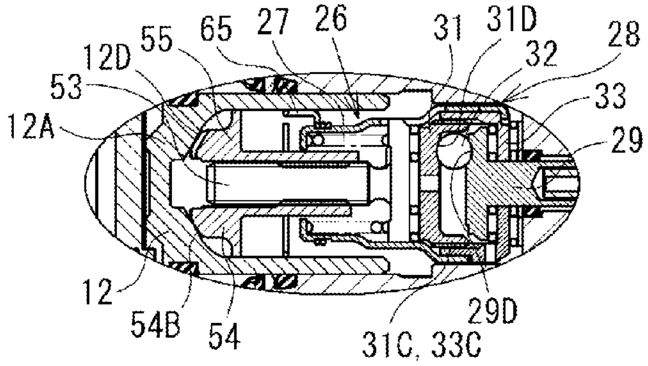
FIGS. 6A and 6B are cross-sectional views illustrating the function of the parking brake in the disc brake, which is illustrated in FIG. 1, step by step.
Figure 6B:
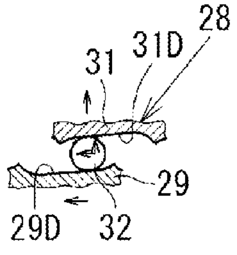

When motor 38 is further driven, and the pressing force against disc rotor D by piston 12 starts to be generated by the function of screw mechanism 52, then this time, rotation resistance generated at the screwed portion of push rod 53 and nut 55 is increased by axial force following that pressing force, and the necessary rotational torque T2 necessary to advance nut 55 is increased. Then, such necessary rotational torque T2 becomes larger than such necessary rotational torque T1 necessary to actuate ball-and-ramp mechanism 28, that is, to advance rotation/linear motion ramp 31. As a result, the rotation of push rod 53 is stopped, and the rotation of base nut 33 is stopped through retainer 26 in which the relative rotation to push rod 53 is regulated. Then, as illustrated in FIG. 6A and FIG. 6B, rotation/linear motion ramp 31 advances in the axial direction while rotating, whereby piston 12 advances through screw mechanism 52, that is, push rod 53 and nut 55, whereby the pressing force of piston 12 against disc rotor D is increased.

At this time, the rotational torque from rotation ramp 29 is applied to rotation/linear motion ramp 31, whereby rotation/linear motion ramp 31 receives application of a sum of the thrust force generated in ball grooves 31D and the thrust force generated by being screwed with base nut 33. Moreover, at this time, push rod 53 is allowed to advance against the urging force of coil spring 27. Note that, in this example, at first, screw mechanism 52 is actuated, whereby nut 55 advances, whereby piston 12 is allowed to advance to obtain the pressing force against disc rotor D, and accordingly, by the actuation of screw mechanism 52, the original position of nut 55 with respect to piston 12, which is changed by chronological abrasion of the pair of inner and outer brake pads 2 and 3, can be adjusted.

Here, a lead L (advance amount of rotation/linear motion ramp 31 when rotation ramp 29 makes one rotation) of ball-and-ramp mechanism 28 is represented by the following expression.

$$L=L_{screw}\times L_{B\&R}/(L_{screw}+L_{B\&R})$$

Here, $L_{screw}$ is a lead of screwed portions 31C and 33C of rotation/linear motion ramp 31 and base nut 33, and $L_{B\&R}$ is a lead of respective ball grooves 29D and 31D. For example, if $L_{screw}$=3 mm, and $L_{B\&R}$=3 mm, then L=1.5 mm is established, and a boost ratio (thrust force with respect to the rotational torque) can be enhanced by reducing the lead.

Then, ECU 70 drives motor 38 until the pressing force from the pair of inner and outer brake pads 2 and 3 to disc rotor D reaches a predetermined value, for example, a current value of motor 38 reaches a predetermined value. Thereafter, when the pressing force to disc rotor D reaches the predetermined value, ECU 70 stops energization to motor 38. Then, in ball-and-ramp mechanism 28, since the rotation of rotation ramp 29 is stopped, the application of the thrust force to rotation/linear motion ramp 31, which is performed by the rolling function of balls 32 between respective ball grooves 29D and 31D, is lost. The reaction force to the pressing force to disc rotor D acts on rotation/linear motion ramp 31 through piston 12 and screw mechanism 52; however, rotation/linear motion ramp 31 is screwed to male screw portion 31C and female screw portion 33C, which are not actuated reversely to base nut 33, and accordingly, rotation/linear motion ramp 31 maintains a stopped state thereof without rotating, and piston 12 is held at the brake position. In this way, the braking force is held, and the actuation of the parking brake is completed.

Next, in an event of releasing the parking brake, based on a parking release operation of parking switch 71, ECU 70 drives motor 38 in a rotation direction of returning piston 12, that is, of spacing piston 12 apart from disc rotor D. Such control for motor 38 in the event of releasing the parking brake is described in detail in [First Control Operation of Electric Motor] and [Second Control Operation of Electric Motor], which will be described later. In this way, multi-spur reduction mechanism 37 and planetary gear reduction mechanism 36 are actuated in the direction of returning piston 12. At this time, the axial force does not act on rotation ramp 29, and accordingly, rotation ramp 29 cannot transfer the rotational torque to rotation/linear motion ramp 31 until balls 32 return to initial positions (initial position of ball-and-ramp mechanism 28) between respective ball grooves 29D and 31D of rotation ramp 29 and rotation/linear motion ramp 31. Hence, at an initial stage of the release, only rotation ramp 29 rotates.

Figure 7A:
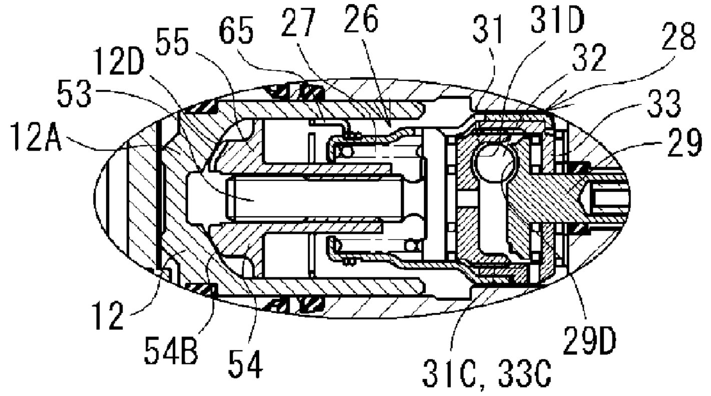
FIGS. 7A and 7B are cross-sectional views illustrating the function of the parking brake in the disc brake, which is illustrated in FIG. 1, step by step.
Figure 7B:
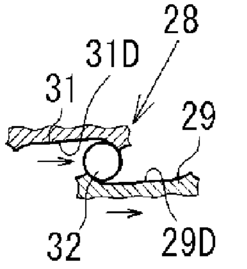
Figure 8A:
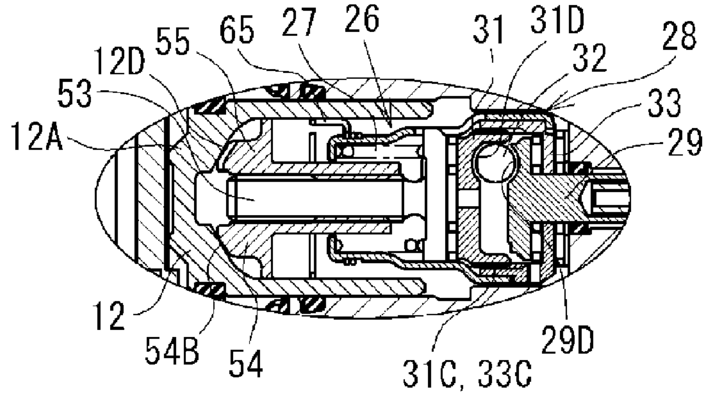
FIGS. 8A and 8B are cross-sectional views illustrating the function of the parking brake in the disc brake, which is illustrated in FIG. 1, step by step.
Figure 8B:
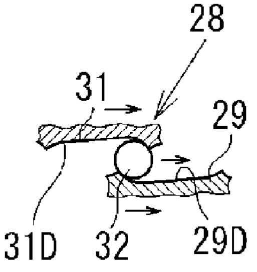

Next, when rotation ramp 29 rotates and balls 32 return to the initial position between respective ball grooves 29D and 31D of rotation ramp 29 and rotation/linear motion ramp 31 as illustrated in FIG. 7B, then as illustrated in FIGS. 8A and 8B, rotation ramp 29 starts to transfer the rotational torque through balls 32 to rotation/linear motion ramp 31. At this initial stage of the release, the reaction force to the pressing force to disc rotor D is applied to nut 55, and accordingly, rotation ramp 29 is not enabled to rotate rotation/linear motion ramp 31. As described above, the ball-and-ramp mechanism 28 temporarily stops the actuation of piston 12 against the rotation of motor 38 after the release control for inner brake pad 2 is started.

That is to say, necessary rotational torque T4 necessary to relatively rotate male screw portion 31C and female screw portion 33C, which are large-diameter rotation/linear motion ramp 31 and base nut 33, is smaller than total necessary rotational torque T5+T3 of rotational torque T5 necessary to rotate screwed portions 53C and 55C of push rod 53 and nut 55 and the rotational resistance torque T3 by spring clutch 65. Therefore, by the rotation of rotation ramp 29, rotation/linear motion ramp 31, retainer 26 and push rod 53 rotate integrally with one another against the urging force of spring clutch 65. In this way, push rod 53 and nut 55 rotate relatively to each other, and nut 55 retreats in the direction of spacing apart from piston 12.

Figure 9A:
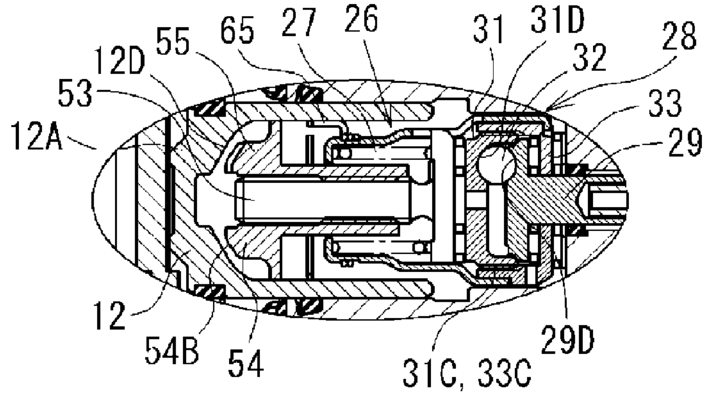
FIGS. 9A and 9B are cross-sectional views illustrating the function of the parking brake in the disc brake, which is illustrated in FIG. 1, step by step.
Figure 9B:
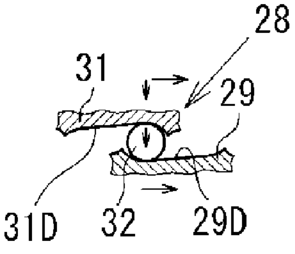

Then, by the retreat of nut 55, the pressing force of piston 12 to disc rotor D is reduced, and such necessary rotational torque T4 necessary to relatively rotate male screw portion 31C of rotation/linear motion ramp 31 and female screw portion 33C of base nut 33 becomes smaller than the rotational resistance torque T3 of spring clutch 65. In this way, the rotation of retainer 26 is stopped, and as illustrated in FIG. 9A and FIG. 9B, rotation/linear motion ramp 31 retreats while rotating with respect to base nut 33 together with rotation ramp 29, and returns to the initial position, and the release of the parking brake is completed. Here, ECU 70 makes control to stop motor 38 based on a drive time of motor 38 for the release and a motor current to motor 38 for the release so that an initial position of nut 55 can be an initial position (initial position of application control) in which piston 12 is appropriately spaced apart from nut 55.

Note that, in this example, the rotational torque is transferred from rotation ramp 29 through balls 32 to rotation/linear motion ramp 31. However, the present invention is not limited to this, and such protrusions which engage with each other when rotation ramp 29 and rotation/linear motion ramp 31 are located at positions illustrated in FIG. 4B may be individually formed on rotation ramp 29 and rotation/linear motion ramp 31 without interposing balls 32 therebetween. By these protrusions, rotation ramp 29 directly rotates rotation/linear motion ramp 31, and durability of balls 32 and respective ball grooves 29D and 31D is enhanced.

[First Control Operation of Electric Motor]

Figure 10:
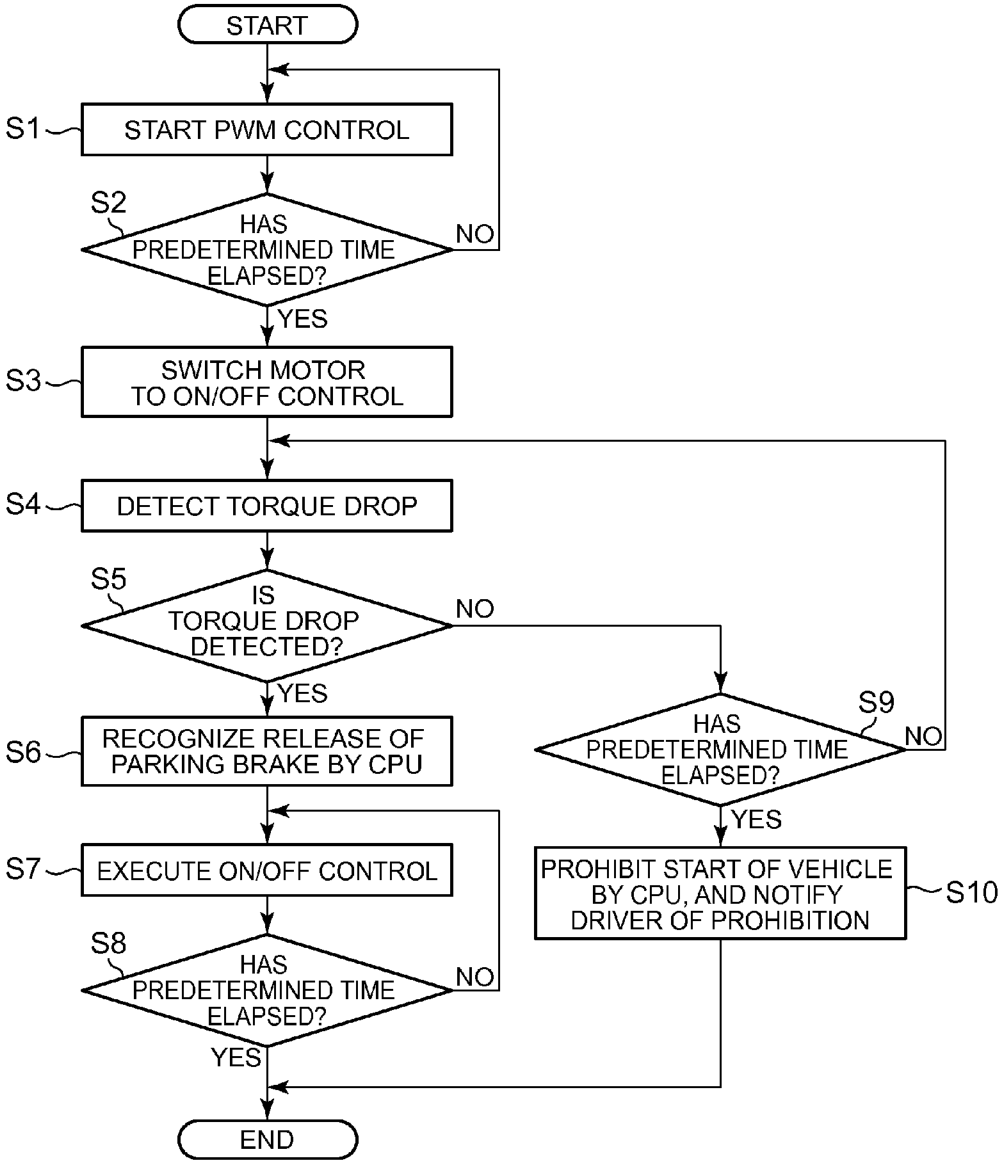
FIG. 10 is a flowchart illustrating a first control operation of an electric motor in an event of releasing the parking brake in the electric parking brake device according to this embodiment of the present invention.

Next, the first control operation of electric motor 38 in the event of releasing the parking brake is described by a flowchart of FIG. 10. As mentioned above, based on the parking release operation of parking switch 71, ECU 70 drives motor 38 so as to space piston 12 apart from disc rotor D. In this way, such fastening of inner pad 2 thrust against disc rotor D is released.

In this event, by motor 38, the release control as illustrated in the flowchart of FIG. 10 is performed for inner pad 2. First, the drive of motor 38 is started according to the PWM control by ECU 70 (Step S1). In Step S2 subsequent thereto, it is determined whether or not a predetermined time (fixed time) has elapsed, and motor 38 is driven according to the PWM control until the predetermined time has elapsed. After the predetermined time has elapsed, motor 38 is switched (changed) from the PWM control to the ON/OFF control and driven by ECU 70 (Step S3).

In the next Step S4, the decrease of the pressing force of inner brake pad 2 to disc rotor D, in other words, a torque drop of the rotation-linear motion conversion mechanism is detected by a change of a drive current of motor 38 (Step S5). When the torque drop is detected, information on this is supplied to ECU 70, and ECU 70 recognizes that the parking brake is released (Step S6). Then, the ON/OFF control is executed during a predetermined time after the switching in Step S3, and the release operation is ended (Steps S7 and S8). In this way, inner and outer brake pads 2 and 3 depart from disc rotor D, and the parking brake is released.

Meanwhile, in a case in which the torque drop is not detected in Step S5, the torque drop is detected based on the change of the drive current by the ON/OFF control until a predetermined time elapses from the switch to the ON/OFF control (Steps S9, S4 and S5). In a case in which the torque drop is not detected even after the predetermined time has elapsed, then the parking brake is not released, and accordingly, ECU 70 performs processing for prohibiting the start of the vehicle, notifies the driver of such non-detection by a warning lamp, a warning buzzer and the like (Step S10), and ends the release control.

Figure 11:
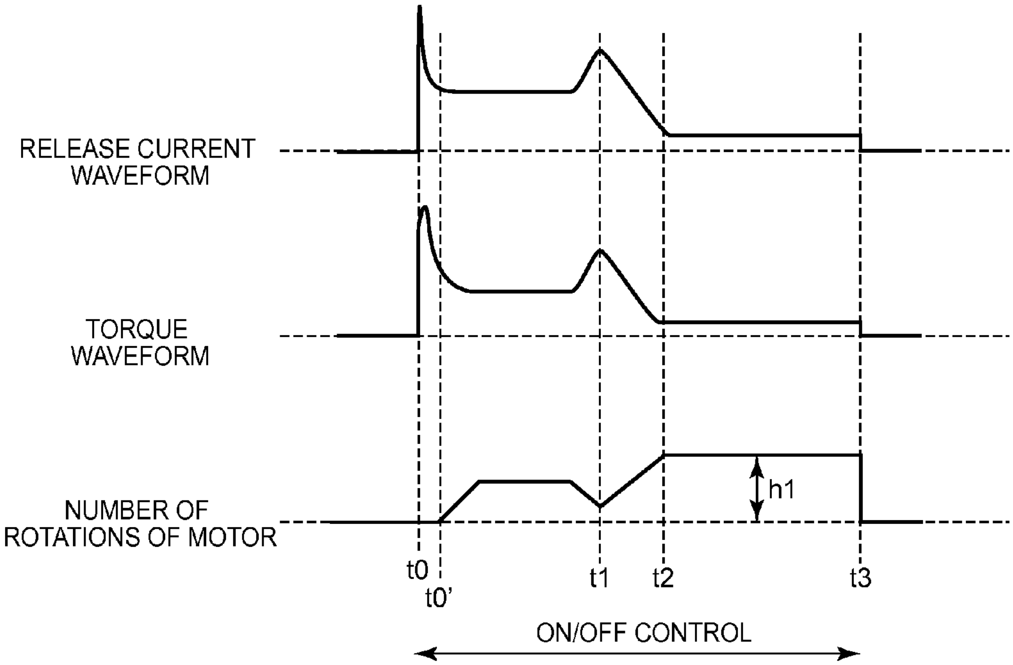
FIG. 11 is a timing chart in a case of driving the electric motor by ON/OFF control in the event of releasing the parking brake.
Figure 12:
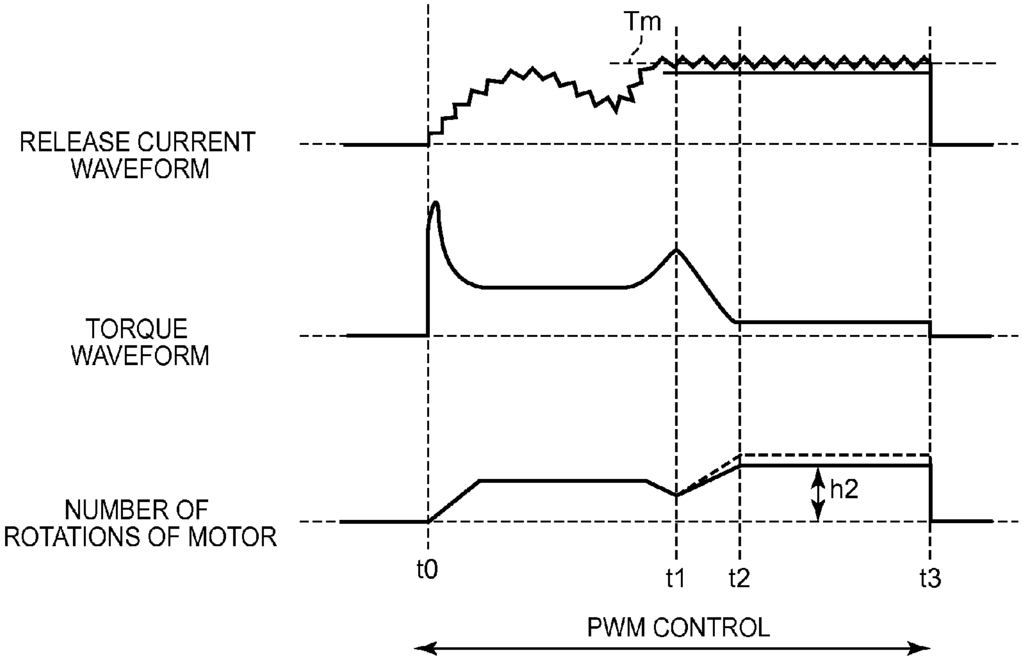
FIG. 12 is a timing chart in a case of driving the electric motor by PWM control in the event of releasing the parking brake.
Figure 13:
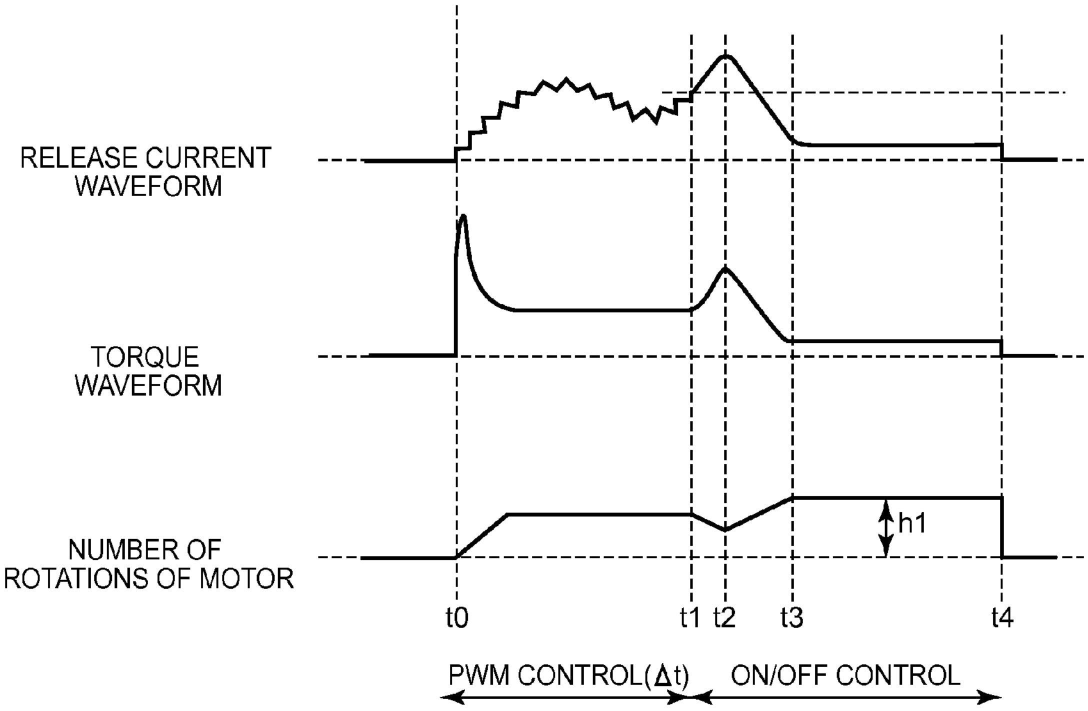
FIG. 13 is a timing chart illustrating a release current waveform, a torque waveform and a number of rotations of the motor in the first control operation illustrated in FIG. 10.

FIG. 11 to FIG. 13 individually illustrate release current waveforms, torque waveforms and numbers of rotations of the motor while comparing, in the above-described release control, a case of driving motor 38 according to the ON/OFF control, a case of driving motor 38 according to the PWM control, and a case of this embodiment (first control operation, in which motor 38 is driven according to the PWM control at the initial stage, and then the drive thereof is changed to the drive according to the ON/OFF control after the elapse of the predetermined time) with one another. As illustrated in FIG. 11, when motor 38 is driven according to the ON/OFF control, an inrush current flows in an initial period of a release current since motor 38 is activated from the stopped state. Then, motor 38 starts to rotate at a time t0' delayed a little from such activation (time t0). It is detected that the drive current of motor 38 is decreased stepwise, that is, drastically decreased by a predetermined value or more during a period between a time t1 and a time t2, whereby the decrease of the pressing force of inner brake pad 2 to disc rotor D, in other words, the torque drop of the rotation-linear motion conversion mechanism is detected. Thereafter, the drive of the motor is stopped at a time t3 when the predetermined time has elapsed. However, the number of rotations of the motor between the time t2 and the time t3 is relatively high (h1), whereby operating noise of the reduction mechanism is increased.

Moreover, as illustrated in FIG. 12, when motor 38 is driven according to the PWM control, current control by feedback is performed so that the torque can be target torque Tm necessary to release the braking force, and accordingly, the release current is gradually changed from the time t0 so as to approach the target torque Tm bit by bit. Therefore, though there is a drastic change in the torque waveform between the time t1 and the time t2, the change to decrease stepwise does not occur in the release current waveform. This is because the drive current is returned by the feedback so as to approach the target torque Tm before the drive current is drastically decreased. Meanwhile, the number of rotations of the motor is reduced (h2<h1) in comparison with the ON/OFF control, and accordingly, the operating noise of the reduction mechanism is reduced.

As opposed to this, as illustrated in FIG. 13, motor 38 is driven according to the PWM control at the initial state, and is then changed (switched) to the ON/OFF control and driven at the time t1 after the predetermined time (Δt1) has elapsed, whereby current characteristics by the mechanical mechanism appear, and accordingly, a period (between the time t2 and the time t3) while the drive current is decreased stepwise occurs in the release current waveform. This predetermined time Δt1 is set as a time while the actuation of piston 12 is temporarily stopped with respect to the rotation of motor 38 after the release control for inner brake pad 2 as the brake pad is started, or as a time until the actuation of piston 12 is started after the release control for inner brake pad 2 is started, and an example of the predetermined time Δt1 is approximately 100 msec. The stepwise decrease of this current value is detected, whereby the decrease of the pressing force of inner brake pad 2 to disc rotor D, in other words, the torque drop of the rotation-linear motion conversion mechanism can be detected. Then, the release control is ended at a time t4.

Hence, in accordance with this first control operation, the torque drop of the rotation-linear motion conversion mechanism can be detected by the change of the drive current of motor 38, and accordingly, it is easy to detect that the parking brake is released, and such a possibility of the rear wheel dragging can be reduced.

[Second Control Operation of Electric Motor]

Figure 14:
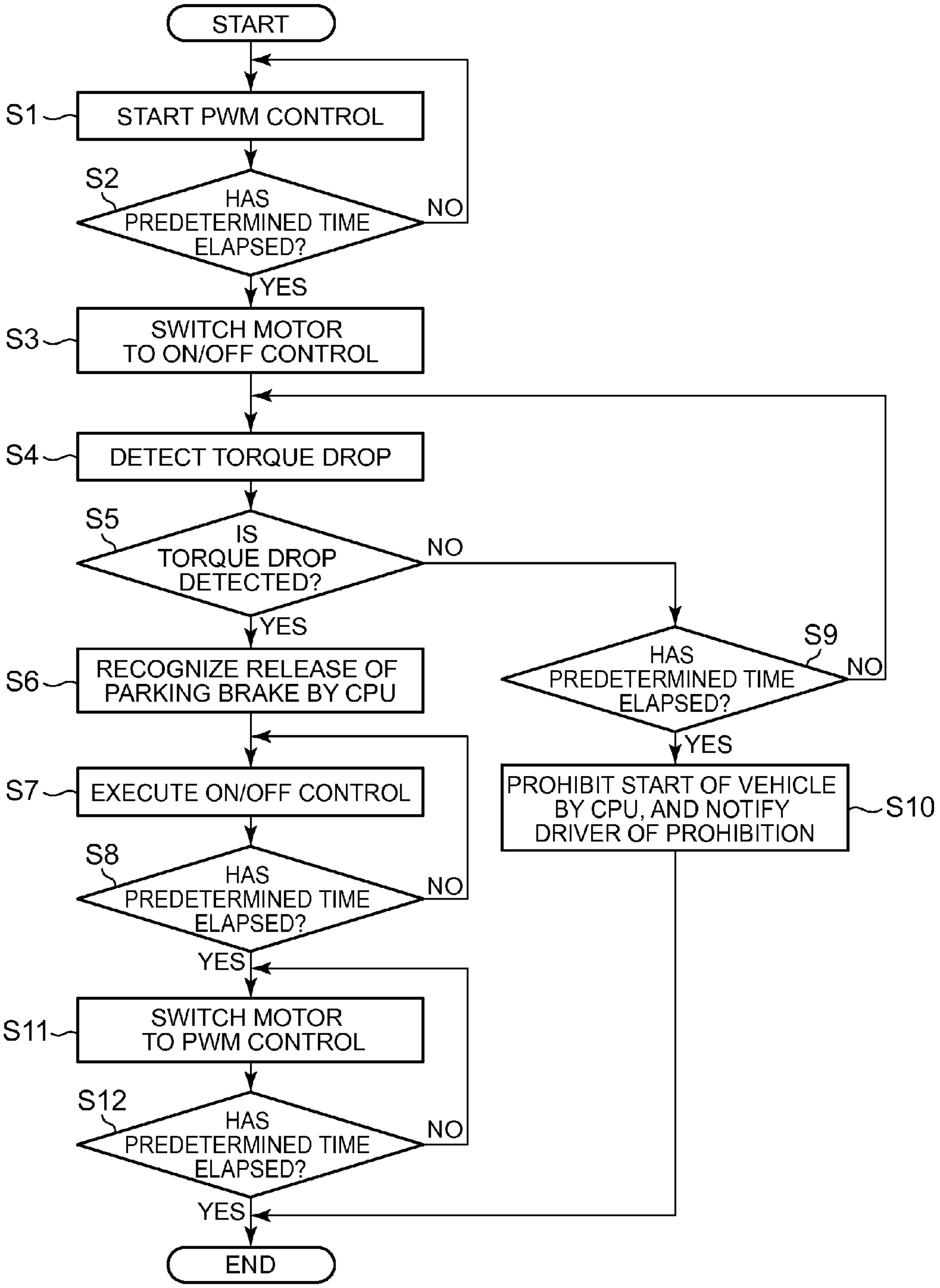
FIG. 14 is a flowchart illustrating a second control operation of the electric motor in the event of releasing the parking brake in the electric parking brake device according to the embodiment of the present invention.

FIG. 14 is a flowchart illustrating the second control operation of motor 38 in the event of releasing the parking brake. When the release control for inner brake pad 2 is started, motor 38 starts to be driven according to the PWM control by ECU 70 (Step S1). In Step S2 subsequent thereto, it is determined whether or not a predetermined time (fixed time) has elapsed, and motor 38 is driven according to the PWM control until the predetermined time has elapsed. After the predetermined time has elapsed, motor 38 is switched (changed) from the PWM control to the ON/OFF control and driven by ECU 70 (Step S3).

In the next Step S4, the decrease of the pressing force of inner brake pad 2 to disc rotor D, in other words, the torque drop of the rotation-linear motion conversion mechanism is detected by the change of the drive current of motor 38 (Step S5). When the torque drop is detected, information on this is supplied to ECU 70, and ECU 70 recognizes that the parking brake is released (Step S6). Then, the ON/OFF control of motor 38 is executed during a predetermined time after the switching to the ON/OFF control (Steps S7 and S8), and thereafter, motor 38 is switched to the PWM control (Step S11). The PWM control is executed during a predetermined time after this switching (Steps S11 and S12), and the release operation is ended. In this way, inner and outer brake pads 2 and 3 leave disc rotor D, and the parking brake is released.

Meanwhile, in a case in which the torque drop is not detected in Step S5, it is determined whether or not a predetermined time has elapsed after the switching to the ON/OFF control (Step S9), and the torque drop is detected based on the change of the drive current by the ON/OFF control until the predetermined time elapses (Steps S9, S4 and S5). In a case in which the torque drop is not detected even after the predetermined time has elapsed after the switching to the ON/OFF control, then the parking brake is not released, and accordingly, ECU 70 performs the processing for prohibiting the start of the vehicle, notifies the driver of the non-detection by the warning lamp, the warning buzzer and the like (Step S10), and ends the release control.

Figure 15:
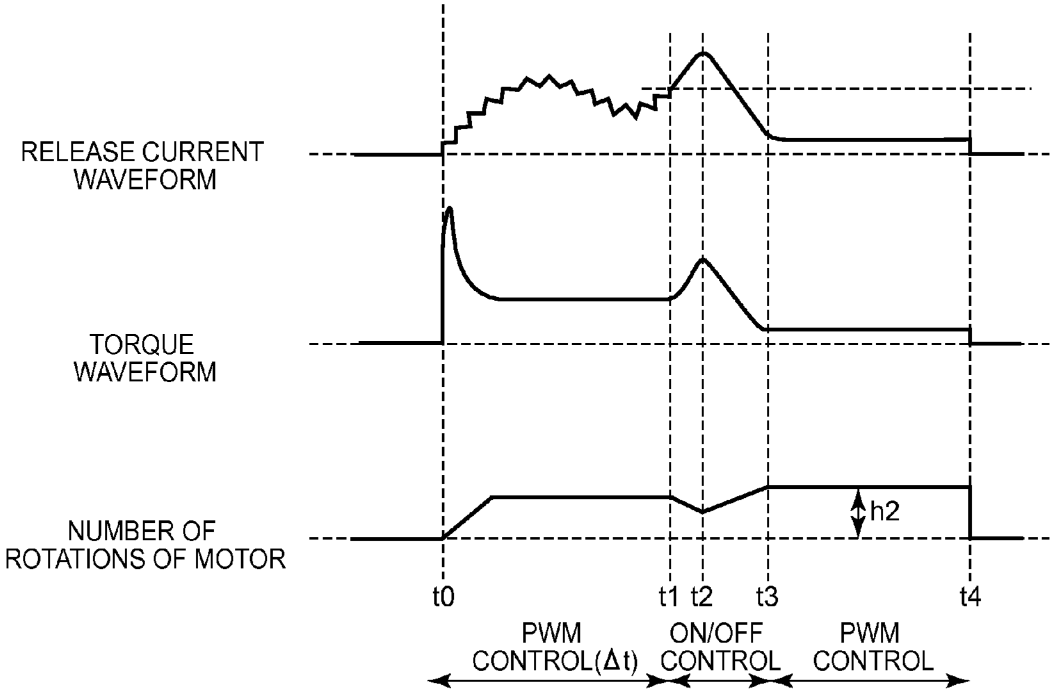
FIG. 15 is a timing chart illustrating a release current waveform, a torque waveform and a number of rotations of the motor in the second control operation illustrated in FIG. 14.

FIG. 15 illustrates a release current waveform, a torque waveform and a number of rotations of the motor in the second control operation during the release control. When motor 38 is driven according to the PWM control at the initial stage, and is then changed (switched) to the ON/OFF control and driven at the time t1 after the predetermined time (Δt1) has elapsed, then a period (between the time t2 and the time t3) while the drive current is decreased stepwise occurs in the release current waveform. An example of this predetermined time Δt1 is approximately 100 msec. The stepwise decrease of this current value is detected, whereby the decrease of the pressing force of inner brake pad 2 to disc rotor D, in other words, the torque drop of the rotation-linear motion conversion mechanism can be detected. At the time t3 after the torque drop is detected, motor 38 is switched to the PWM control again and is driven. Then, the PWM control is executed for a predetermined time after the time t4, and the release control is ended.

In accordance with this second control operation, the torque drop of the rotation-linear motion conversion mechanism can be detected by the change of the drive current of motor 38, and accordingly, it is easy to detect that the parking brake is released, and the possibility of the rear wheel dragging can be reduced. Moreover, motor 38 is switched to the PWM control after the torque drop is detected, whereby the number of rotations of motor 38 can be decreased (h2), and the operation noise of the reduction mechanism, for example, a sound when the gears slide on each other can be reduced. Hence, the reduction of the operating noise of the reduction mechanism can be realized while reducing the possibility of the rear wheel dragging by detecting the torque drop.

Note that, in the case in which the torque drop cannot be detected according to the ON/OFF control during the predetermined time, then by ECU 70, the start of the vehicle is prohibited, the driver is notified of the non-detection, and the release control is ended; however, in a similar way to the case in which the torque drop is detected, motor 38 may be switched to the PWM control, and the release control may be ended after executing the PWM control during the predetermined time.

As mentioned above, in disc brake 1 having the configuration illustrated in FIG. 1 to FIG. 3 and FIGS. 4A and 4B to FIGS. 9A and 9B, when piston 12 is moved forward and held at the brake position as in a mode of the parking brake, in the event of adding the pressing force from the pair of inner and outer brake pads 2 and 3 to disc rotor D, screw mechanism 52, which includes screwed portion 31C of rotation/linear motion ramp 31 and screwed portion 33C of base nut 33, screw mechanism 52 having low mechanical efficiency, and ball-and-ramp mechanism 28 having high mechanical efficiency are combined with each other, whereby the pressing force to disc rotor D can be held while ensuring good actuation efficiency of piston holding mechanism 34. In this way, the configuration can be simplified in comparison with a ratchet mechanism, and manufacturing efficiency of disc brake 1 can be enhanced.

Moreover, on piston 12, there acts not only the pressing force from male screw portion 31C and female screw portion 33C, which are the screwed portions of rotation/linear motion ramp 31 and base nut 33, but also the pressing force from ball-and-ramp mechanism 28, and accordingly, desired braking force can be obtained even if motor 38 is miniaturized. Furthermore, motor 38 is miniaturized (reduced in torque), whereby the torque applied to multi-spur reduction mechanism 37 and planetary gear reduction mechanism 36 can also be suppressed to be low, and accordingly, advantages in terms of the operating noise and the lifetime are brought.

In addition, screw mechanism 52 including push rod 53 and nut 55, in which rotation-linear motion conversion efficiency is better than in ball-and-ramp mechanism 28, is used, whereby responsiveness in the event of actuating the parking brake is enhanced.

Note that, although multi-spur reduction mechanism 37 and planetary gear reduction mechanism 36 are employed as the reduction mechanisms, other well-known reduction mechanisms such as a cycloid reduction gear and a wave motion decelerator may be employed. Moreover, although walls 32 are employed as rolling elements of ball-and-ramp mechanism 28, a roller-and-ramp mechanism using a cylindrical member excellent in load durability may be employed.

Moreover, spring clutch 65 is used as the member that applies the rotational resistance torque to retainer 26 at the time of releasing the pressing force to disc rotor D; however, like a well-known disc brake caliper added with a hand brake, a configuration may be adopted so that, by providing a collar portion on retainer 26, movement of disc rotor D with respect to cylinder 10 in the axial direction can be regulated by a retaining ring through an washer and the like. Here, if coil spring 27 is designed to be contracted after the retaining ring is assembled, then the urging force of coil spring 27 is applied to the collar portion, the washer and the retaining ring, and accordingly, the rotational resistance torque can be generated in this region.

Furthermore, the actuation of piston holding mechanism 34 is described by exemplifying the parking brake as an example of the function for maintaining the stopped state of the vehicle; however, piston holding mechanism 34 that is the parking brake mechanism may be actuated in such a case as a time of hill start assistance for assisting the start of the vehicle on a slope, a time of hill down braking assistance and a time of automatic stop when the vehicle is in the stopped state by turning off an accelerator.

Still further, the description is made of the example in which the present invention is applied to the disc brake including the electric parking brake mechanism; however, the present invention is not limited to the disc brake having the configuration illustrated in FIG. 1 to FIG. 3 and FIGS. 4A and 4B to FIGS. 9A and 9B, and is also applicable to a variety of other configurations as long as the configurations relate to the electric parking brake device that holds the parking brake in a braking state by the rotation-linear motion conversion mechanism that converts the rotation of the electric motor into the motion in the linear direction, and releases the parking brake by the rotation-linear motion conversion mechanism.

The entire contents of Japanese Patent Application No. 2014-156915, filed on Jul. 31, 2013, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. An electric parking brake device that holds a parking brake in a braking state by a rotation-linear motion conversion mechanism that converts rotation of an electric motor into a motion in a linear direction, and releases the parking brake by the rotation-linear motion conversion mechanism, the electric parking brake device comprising:
a drive control device configured to control the parking brake, the drive control device driving the electric motor according to pulse width modulation (PWM) control and changing the electric motor to drive according to ON/OFF control after a predetermined time has elapsed after start of the PWM control in a case of releasing the parking brake.

2. The electric parking brake device according to claim 1, wherein the drive control device detects a torque drop of the rotation-linear motion conversion mechanism after changing the electric motor to the drive according to the ON/OFF control.

3. The electric parking brake device according to claim 2, wherein, in a case of detecting the torque drop of the rotation-linear motion conversion mechanism, the drive control device changes the electric motor from the drive according to the ON/OFF control to the drive according to the PWM control.

4. The electric parking brake device according to claim 3, wherein the drive control device executes the PWM control during a predetermined time.

5. The electric parking brake device according to claim 2, wherein the drive control device detects the torque drop of the rotation-linear motion conversion mechanism based on a predetermined value or more of a change of a drive current in the ON/OFF control of the electric motor.

6. The electric parking brake device according to claim 5, wherein the predetermined value or more of the change of the drive current is a change in which the drive current is decreased stepwise.

7. The electric parking brake device according to claim 2, wherein, in a case of not detecting the torque drop of the rotation-linear motion conversion mechanism during a predetermined time, the drive control device prohibits start of a vehicle or notifies a driver of non-detection of the torque drop.

8. The electric parking brake device according to claim 1, wherein the drive control device includes an electronic control unit (ECU) that makes control to drive the electric motor based on a signal from a parking switch or a vehicle.

9. An electric parking brake device comprising:
a piston that presses a brake pad against a rotor;
a transfer mechanism that moves the piston forward by converting rotation of an electric motor into a motion in a linear direction, presses the brake pad against the rotor, and holds the brake pad at a brake position;
a ball-and-ramp mechanism that temporarily stops actuation of the piston with respect to the rotation of the electric motor after the brake pad starts to be released; and
a drive control device that makes control to drive the electric motor, the drive control device drives the electric motor according to pulse width modulation (PWM) control when the brake pad starts to be released, and after a predetermined time has elapsed after start of the PWM control, changes the electric motor to ON/OFF control and drives the electric motor.

10. The electric parking brake device according to claim 9,
wherein the predetermined time is a time while the actuation of the piston is temporarily stopped with respect to the rotation of the electric motor after release control for the brake pad is started, or a time until the actuation of the piston is started after the release control for the brake pad is started.

11. The electric parking brake device according to claim 10,
wherein the drive control device detects a decrease of pressing force of the brake pad to the rotor based on a predetermined value or more of a change of a drive current in the ON/OFF control for the electric motor.

12. The electric parking brake device according to claim 11,
wherein the predetermined value or more of the change of the drive current is a change in which the drive current is decreased stepwise.

13. The electric parking brake device according to claim 11,
wherein, after detecting the decrease of the pressing force of the brake pad to the rotor, the drive control device performs the PWM control for the electric motor during a predetermined time, and spaces the brake pad apart from the rotor.

14. The electric parking brake device according to claim 9,
wherein the drive control device includes an electronic control unit (ECU) that makes control to drive the electric motor based on a signal from a parking switch or a vehicle.

15. A release method of an electric parking brake device that holds a parking brake in a braking state by a rotation-linear motion conversion mechanism that converts rotation of an electric motor into a motion in a linear direction, and releases the parking brake by the rotation-linear motion conversion mechanism, the release method comprising:
driving the electric motor according to pulse width modulation (PWM) control;
sensing that a predetermined time has elapsed after start of the PWM control; and
changing the electric motor to drive according to ON/OFF control.

16. The release method of an electric parking brake device according to claim 15, further comprising:
detecting a torque drop of the rotation-linear motion conversion mechanism after the changing the electric motor to drive according to ON/OFF control.

17. The release method of an electric parking brake device according to claim 16, further comprising:
changing the electric motor from the drive according to the ON/OFF control to the drive according to the PWM control during a predetermined time in a case of detecting the torque drop of the rotation-linear motion conversion mechanism.

18. The release method of an electric parking brake device according to claim 16,
wherein the torque drop of the rotation-linear motion conversion mechanism is detected based on a predetermined value or more of a change of a drive current in the ON/OFF control of the electric motor.

19. The release method of an electric parking brake device according to claim 18,
wherein the predetermined value or more of the change of the drive current is a change in which the drive current is decreased stepwise.

20. The release method of an electric parking brake device according to claim 16, further comprising:

in a case of not detecting the torque drop of the rotation-linear motion conversion mechanism during a predetermined time, prohibiting start of a vehicle or notifies a driver of non-detection of the torque drop.

* * * * *